United States Patent [19]

Barton et al.

[11] Patent Number: 4,740,389

[45] Date of Patent: Apr. 26, 1988

[54] COMPOSITION AND METHOD FOR PRODUCING LAYERS WITH A HIGH SPECIFIC SURFACE ON IRON ALUMINUM, ZINC, AND TECHNICAL ALLOYS

[75] Inventors: Karel Barton; Jaroslav Chocholousek; Miroslav Jaros; Radomir Ruzicka, all of Prague; Jaroslab Lohnisky, Usti; Milan Seidl; Frantisek Knotek, both of Velvary; Josef Hauser, Vysoke Myto, all of Czechoslovakia

[73] Assignee: Statni Vyzkmoy Ustav Ochrany Materialu G.V. Akimova, Prague, Czechoslovakia

[21] Appl. No.: 794,233

[22] Filed: Oct. 29, 1985

Related U.S. Application Data

[63] Continuation-in-part of Ser. No. 656,497, Oct. 1, 1984, abandoned.

[30] Foreign Application Priority Data

Sep. 30, 1983 [CS] Czechoslovakia .................... 7177-83

[51] Int. Cl.[4] .......................... B05D 1/18; B05D 1/36; B05D 5/10; C04B 9/02

[52] U.S. Cl. .............................. 427/207.1; 106/14.14; 106/287.1; 106/287.17; 106/287.34; 148/6.27; 427/415; 427/419.1; 427/435

[58] Field of Search ................... 106/1.22, 1.25, 14.12, 106/14.13, 14.14, 287.1, 287.17, 287.29, 287.34; 148/6.14 R, 6.15 R, 6.27; 252/389.1, 389.2, 389.3, 389.53, 396; 427/207.1, 415, 419.1, 435

[56] References Cited

U.S. PATENT DOCUMENTS 3,297,616 1/1967 Fisher et al. ................. 106/14.14 X
4,404,114 9/1983 Mohr et al. .................. 106/14.13 X
4,497,667 2/1985 Vashi ............................ 148/6.27 X

FOREIGN PATENT DOCUMENTS 154586 12/1980 Japan ................................. 148/6.27

*Primary Examiner*—Michael R. Lusignan

[57] ABSTRACT

This invention relates to a composition and method for producing a surface layer with a high specific surface on iron, aluminum, zinc, and on technical alloys of these metals. The composition provides an adhesive layer that may be subsequently used to securely bind other materials, and organic materials in particular, to the surface of the metal or alloy. The composition may be applied by spraying under pressure, by dipping, or as a paste at ambient temperatures. The composition is predominantly amorphous, and provides a uniform, stable, and economical method of priming metals for the reception of a final outer coating.

16 Claims, No Drawings

COMPOSITION AND METHOD FOR PRODUCING LAYERS WITH A HIGH SPECIFIC SURFACE ON IRON ALUMINUM, ZINC, AND TECHNICAL ALLOYS

CROSS-REFERENCE TO RELATED CASES

This application is a continuation-in-part of application Ser. No. 656,497, filed Oct. 1, 1984, now abandoned.

This invention relates to a composition and method for producing a surface or gel layer with a high specific surface on iron, aluminum, zinc, and on technical alloys of these metals. The composition provides an adhesive layer that may be used to securely bind other materials to the surface of the metal or alloy. The gel layer of the invention is produced prior to the application of any organic layer, and promotes improved adhesion between the organic layer and the metal substrate.

BACKGROUND OF THE INVENTION

For diverse technological purposes it is necessary to form surface layers on metals to insure a firm and durable adhesive contact with other materials, and with organic materials in particular. Typical examples are phosphate, chromate, and oxide layers used to bind paints, plastics, insulating foams, rubber, and other organic coatings to iron, aluminum, zinc, and their alloys.

The production of surface layers is achieved by reaction of the metal with a specially composed media at controlled conditions. The resulting layer is either crystalline, as in phosphate or oxide layers, or it is partly crystalline and partly amorphous in structure, as in chromate layers.

The industrial manufacture of these surface layers requires complicated multistep procedures, large processing plants, and a very large investment in power and equipment. Expensive water-neutralization and waste-purification procedures and equipment are also needed whenever the coating solution contains hazardous compounds, such as chromates.

The treatment of metals with a coating is dislosed in Fisher, U.S. Pat. No. 3,297,616; Mohr, U.S. Pat. No. 4,404,114; and Vashi, U.S. Pat. No. 4,497,667. These references are distinguishable from the invention, because unlike the present composition and process they are concerned with a pretreatment process for activation of another adhesive (Vashi); a pigmented and self curing final coating (Fisher); and a corrosion inhibitor (Mohr).

These disadvantages are largely alleviated by the present invention, which provides a novel composition for the production of layers with a high specific surface on iron, aluminum, zinc, and their technical alloys.

SUMMARY OF THE INVENTION

According to the invention, an aqueous solution is prepared containing the following components:

1 to 30 g/l (preferably 15 to 25 g/l) metasilicates, monosilicates or polysilicates of alkaline metals and/or silica sol transformed to $SiO_2$, with molar ratios of alkali metal oxide to $SiO_2$ of 0.07 to 1 (preferably 0.80 to 0.99);

0.1 to 2 g/l (preferably 0.15 to 0.5 g/l) sodium aluminate and/or aluminum hydroxide sol transformed to $Al_2O_3$, with molar ratios of alkali metal oxide to $Al_2O_3$ of 0.05 to 1, preferably 0.6 to 1;

0.05 to 0.5 g/l (preferably 0.05 to 0.15 g/l) ferric hydroxide sol transformed to $Fe_2O_3$;

chelating agents, such as 1 to 5 g/l (preferably 3 to 5 g/l) $Na_4EDTA$ and/or 0.1 to 2 g/l (preferably 1 to 1.5 g/l) sodium huminate;

hydroxyl ion activity corresponding to pH 11 to 13 (preferably 11.5 to 12.5); and protective colloids, such as 0.1 to 1 g/l sodium carboxymethycellulose, starch, polyvinylalcohol, sodium huminate, and/or calcium ligninsulphonate.

For special applications, such as ambient temperature conditions, the solution may also contain:

thickeners, such as 5 to 50 g/l polyvinylalcohol, sodium carboxymethylcellulose and/or starch; and 0.01 to 0.1 g/l surfactant, such as an adduct of polyethylene oxide with higher fatty alcohols having 8 or more carbons dissolved in water.

The composition of the present invention operates to promote the formation of the desired surface layer by reaction with the primary reaction components to produce a solid, insoluble, physically coherent, chemically stable, and high specific surface material that is predominantly amorphous in character.

The reaction mechanism of the invention advantageously causes the overlapping production of mixed layers. The initial topochemical reactions produce a thin, discrete, crystalline component based on oxides, hydroxides, or hydroxidoxides of the substrate metal, or on other compounds. Conditions at the reaction interface between the metal substrate and the layering solution promote the formation of amorphous, insoluble, gel-like material which precipitates simultaneously with the thin crystalline layer, to form a stable layer with a high specific surface. This results in a thin, stable, and adherent functional layer with a high specific surface. Plastics, paints, foams, adhesives, and other organic substances may then be bound to the functional layer.

The main reactive components of the initial crystalline precipitation reaction are hydroxide ions ($OH^-$) at pH values between 7 and 14, and ions of polycarbonic and complex-forming compounds that destroy the inherent passivity of the metal, without the formation of soluble hydroxo-complexes. The use of hydroxide ions to activate amphoteric metals, such as zinc or aluminum, is particularly advantageous. Chelating agents, such as $Na_4EDTA$ can also be used to provide an additional activation of the metal via hydroxyl ions.

The main components of the overlapping amorphous precipitation reaction are silicate, polysilicate ions, silica particles colloidally dispersed in the form of hydrosols, aluminate ions, polyaluminate ions, and aluminum hydroxide hydrosols. The silicate ions and silica sol of the composition form silica-gel-like layers, the aluminates and alumina sols react to form an overlapping alumina gel layer, ferric hydroxide sol forms a corresponding overlapping layer, and hydroxyl ions activate the treated metal surface by forming primary hydroxides as an overlapping layer component necessary to achieve a firm bond with the precipitating gel particles. The precipitation of the gel particles to form overlapping layers is promoted by the opposite surface charges of the silica and aluminum (ferric hydroxide) gel particles near the metallic surface.

Alkali metal (sodium) orthophosphate and/or tetraborate may be used advantageously as buffers, to maintain the desired hydroxyl ion activity.

For some uses it is advantageous if the solution contains protective colloids, such as polymeric electrolytes, including acrylic or methacrylic acid (preferably chelated), polyvinyl alcohol, or derivatives of cellulose, such as carboxymethylcellulose. Sodium huminate, calcium ligninsulphonate, and starch may also be used. The protective colloids prevent undesired gel precipitation within the volume of the solution, instead of at or near the metal/solution interface. The surfactants promote activation at the solution/metal interface through their degreasing effect. At ambient temperatures, thickeners such as sodium carboxymethylcellulose and polyvinylalcohol, may be used to form thick (not dripping) layers.

By skillful combination of the elements it is possible to obtain complementary effects that allow for a diversity of applications heretofore unknown in the art. For example, the addition of carboxymethylcellulose or polyvinyl alcohol as polyelectrolytes and thickeners permits the formation of the functional layer by longer action of the layering composition at ambient temperatures. The chelating capacity of the polyelectrolytes participates in layer formation by activating the metal substrate surface, to insure the desired qualitative and quantitative precipitation of the crystalline layer. The electrokinetic properties of the polyelectrolytes can be further selected to participate with the inorganic ions and hydrosols in the formation of the amorphous precipitate.

Complexing agents may be used to hinder the formation of undesirable deposits, particularly when hard water is used as a solvent.

The layering procedure of the invention can be simplified, and the number of steps reduced, by the addition of surface active ingredients. These surfactants simultaneously degrease the metal substrate, increase the number of "active sites" for deposit of the initial crystalline precipitate, and promote the formation of a uniform crystalline layer. The composition of the invention, with surfactants, forms the desired functional adhesive layer in a single step. However, highly greased surfaces require a preliminary degreasing step, which prevents deterioration of the layering solution and decreases manufacturing costs. After formation of the functional layer, rinsing of the treated metal substrate is necessary to remove residues of the solution. In a final step, excess water is removed by drying.

The compostion herein is advantageously improved, from a commercial standpoint, by the addition of pH buffers. These buffers maintain the pH at effective levels for long periods of time, so that hydroxide activation of the metal substrate is sustained. In addition, a constant pH promotes the desired coaggulation of positive and negative sol particles into a gel precipitate at the metal-solution interface. Buffers useful for this purpose include sodium or potassium salts of phosphoric or boric acids. The complexing agents, such as ethylene diaminotetraacetic acid and the like, ensure bisides activating the metal surface that the ions of divalent metals present in the system, such as $Ca^{2+}$, $Mg^{2+}$, $Zn^{2+}$, remain in solution and do not form slurries.

Additional synergistically active components are protective colloids, such as dextrin, gelatin, carboxymethylcellulose, etc.

The double metal hydroxide plus silica and/or alumina gel layer formed according to the invention is extremely thin (less than 0.1 g/m$^2$) but it large specific surface serves to anchor the subsequent organic coating. This thin layer is advantageous because all soluble matter is easily removed by rinsing prior to painting, so that the organic coating is much less susceptible to osmotic blistering under moist conditions than coatings applied over thick conventional adhesives. In contradistinction to known processes, the chelating agents together with the surfactant promotes the primary formation of hydroxide, within and on which the secondary precipitation of silica and alumina gel proceeds. The use of protective colloids acts in synergistic cooperation with the other components to regulate the precipitation of the overlapping adhesive layer when and where precipitation is desired, and at the desired density. In addition, the colloids prolong the shelf life of the solution by preventing the formation of a thick suspension, a viscous slurry, or a well-settled and high volume sludge.

The invention is further described in a number of embodiments, according to the examples given below. It will be understood by those skilled in the art that these examples are merely illustrative, and do not serve to limit the scope of the invention.

EXAMPLE 1

This example relates to the production of an adhesive surface layer on aluminum, formed by spraying and sintering epoxide powder.

An alkaline solution having hydroxide ions in a concentration sufficient to induce the topochemical precipitation of boehmite and positively charged aluminum hydroxide was used. The main source of negative sol particles was sodium metasilicate, which yields the necessary $OH^-$concentration by hydrolysis. The pH of the solution was 12.5, and pH equilibrium was maintained by adding sodium dihydrogenphosphate. Undesired coaggulation and gelling was prevented by the addition of dextrin with a mixture of sodium salts of humic acids. An adduct of polyethylene oxide with the higher fatty alcohols (with 8 to 16 carbon atoms) was added as a nonfoaming wetting agent, since the treated metal was only slightly spoiled, and was to be subjected to a high pressure spray.

The composition of the layering solution was as follows:

| Component | g/l |
|---|---|
| sodium metasilicate $Na_2SiO_3$ 5 $H_2O$ | 25 |
| sodium dihydrogenphosphate $NaH_2PO_4$ | 4 |
| sodium aluminate $NaAlO_2$ | 0.35 |
| sodium salt of humic acids | 0.1 |
| dextrin | 0.5 |
| wetting agent (polyethylene oxide adduct) | 0.1 |
| pH = 12.5 | |

The solution was prepared from a dry mixture of the components by dissolving under heat at the process temperature of 70° C. The resulting solution did not contain solid precipitated as was slightly turbid. A substantial excess of the solution was sprayed on the aluminum substrate surface at 400 kPa pressure for 10, 20, 30, 60, 120, and 240 seconds. The samples were rinsed by spraying with water under pressure, also at 70° C. The plastic coating was applied immediately after drying.

The adhesion and stability of the plastic coating was tested by exposure to the climate and to corrosive conditions. The ability of the adhesive layer to bind the plastic was investigated by conventional grid, bending, and deformation tests. The results were compared with similar tests conducted on known 12 um anodized surfaces. For exposure to the spray of at least 20 seconds, the adhesion values of the present coated metal were found to equal or exceed the strength of the anodized surface. No deterioration, corrosion, or loss of strength resulted from 240 hours exposure to the conventional ASTM salt-spray test, or from 20 cycles of the Kesternich sulphur dioxide water vapor condensation test. Repeated temperature shocks from −60° to 80° C. had no effect on the coating.

Analysis of the samples revealed that the functional layer consists of crystalline AlOOH-boehmite, amorphous aluminum hydroxide, and amorphous silica. The amounts of these materials increased with increasing reaction time up to 60 seconds, when the area mass of the layer reached 1.5 to 2 g/m$^2$ with a content of about 10 to 20% silica ($SiO_2$) and 80 to 90% aluminum hydroxides and hydroxidoxides. The solution was found to remain stable over a long period, with only minor pH adjustment by addition of the concentrated solution, when used in this procedure on an industrial scale. The formation of undesired deposits was negligible, and those which did accumulate were easily removed. No special purification or waste disposal steps were needed.

EXAMPLE 2

Continuous treatment of aluminum and hot dip galvanized steel strips before coating with acrylate paint.

As in example 1, an amphoteric metal is used as the substrate. In order to accelerate the layering process, which was adapted to a dip system instead of a spray system, the composition was as follows:

| Component | g/l |
|---|---|
| sodium metasilicate $Na_2SiO_3$ 5 $H_2O$ | 35 |
| trisodium orthophosphate $Na_3PO_4$ | 10 |
| silica hydrosol with 40 p.c. $SiO_2$ | 10 |
| sodium aluminate $NaClO_2$ | 5 |
| calcium ligninsulphonate (sulphite liquor) | 0.3 |
| dimethylaminoxide | 0.1 |
| pH = 12.5 | |

The components were dissolved in demineralized water. The process temperature was 90° C., with an effective duration of 20 seconds. Adhesion was tested immediately after application of the paint coating, according to the experimental procedures of Example 1. The results were equal or better than those obtained when testing layers based on the $PO_4^{3-}$ and $CrO_4^{2-}$ ions of the prior art.

EXAMPLE 3

Spot-welded black and galvanized sheets.

Galvanized sheets of steel are often used in the manufacture of vehicle parts exposed to corrosive conditions, particularly heavy-duty vehicles designed for rugged or prolonged use. Black steel is usually sufficient for those parts that are not exposed to corrosive conditions. However, the welded parts of both materials must be treated with a single adhesive layer, to insure the uniform application of baked melaminalkyd paint. Classical phosphating processes failed, because the layer did not form at or near the interface of the two materials, because of their different electrochemical characteristics.

This problem was successfully addressed by a two-step spraying process wherein a complete layer was formed on galvanized steel and a partial layer was formed on black steel. The composition of the first layering solution was:

| Component | g/l |
|---|---|
| sodium metasilicate $Na_2SiO_3$ 5 $H_2O$ | 22 |
| trinatrium orthophosphate $Na_3PO_4$ | 12 |
| sodium huminate | 0.2 |
| ethylene oxide + fatty alcohol ($C_8$ to $C_{18}$) | 0.5 |
| tetrasodium ethylene diaminotetraacetate | 2 |
| pH = 12.5 | |

The above solution was sprayed under pressure at 300 to 500 kPa, at a temperature of 70° C. for 60 seconds. Excess solution was permitted to drop off without rinsing. The steel was then sprayed with a second solution at 2 MPa and 50° C. for 30 seconds. This second step provided a layer of mixed silica-aluminum hydroxide gel. The composition of the second solution was:

| Component | g/l |
|---|---|
| sodium stabilized aluminum hydroxide sol | 12 |
| sodium carboxymethylcellulose | 5 |
| pH = 9.2 | |

The melaminalkyd paint was applied to the treated steel, and tests of the three-layer system produced results similar to those in Example 1. The paint adhered uniformly to both the galvanized steel and the black steel, via the double layer adhesive of the invention. The adhesion was strong and smooth even at the interface between the two metals, and even after exposure to adverse climatic conditions.

EXAMPLE 4

Production of the adhesive layer at ambient temperatures.

It is sometimes necessary to treat substrate metals at ambient temperatures, as in the priming of aluminum or galvanized sheet products in the construction industry, prior to painting. The velocity of formation of the adhesive layer depends significantly on temperature, with higher temperatures tending to produce uniform layers more rapidly. At lower temperatures, with slower formation rates, it is useful to supplement the composition of the invention with additives that prevent premature draining and drying of the layering solution.

A composition of the invention that provides the desired characteristics is:

| Component | g/l |
|---|---|
| sodium metasilicate $Na_2SiO_3$ 5 $H_2O$ | 32 |
| sodium aluminate $NaAlO_2$ | 6 |
| sodium dodecylbenzenesulphonate | 2 |
| calcium ligninsulphonate (sulphite liquor) | 2.5 |
| sodium carboxymethylcellulose | 5 |
| pH = 12.4 | |

This solution is highly viscous, and may be used for mixing a thixotropic paste, as by the addition of bentonite clay.

EXAMPLE 5

A second solution useful at ambient temperatures is the same as the composition of Example 4, except that sodium carboxymethylcellulose was replaced by 10 g/l of polyvinyl alcohol.

The solution was applied by brush in the form of a paste, and the paste was rinsed off with water after 1 hour, 3 hours, 12 hours, and 24 hours, respectively. After drying, the treated material was painted with conventional coating materials that dry in air, such as those based on alkyd, epoxy and water-diluted acrylate resins and bitumenous materials. The resulting adhesive layer and coating were successfully resistant to corrosion when tested.

We claim:

1. A composition for producing an adhesive layer precipitate with a high specific surface on iron, aluminum, zinc, and their technical alloys, comprising in aqueous solution:

1 to 30 g/l of silicate selected from the group consisting of metasilicates, monosilicates and polysilicates of alkaline metals, and silica sol transformed to $SiO_2$, with molar ratios of alkali metal oxide to $SiO_2$ of 0.07 to 1;

0.1 to 2 g/l of aluminate selected from the group consisting of sodium aluminate and aluminum hydroxide sol transformed to $Al_2O_3$, with molar ratios of alkali metal oxide to $Al_2O_3$ of 0.05 to 1;

0.05 to 0.5 g/l of ferric hydroxide sol transformed to $Fe_2O_3$;

chelating agents selected from the group consisting of 1 to 5 g/l $Na_4EDTA$ and 0.1 to 2 g/l sodium huminate;

pH buffers, whereby the hydroxyl ion activity corresponds to a pH of 11 to 13;

0.1 to 1 g/l of protective colloids in the form of polymeric electrolytes selected from the group consisting of sodium carboxymethylcellulose, starch, polyvinylalcohol, sodium huminate, and calcium ligninsulphonate; and 0.01 to 0.1 g/l of surfactant.

2. A composition as in claim 1, additionally comprising:

5 to 50 g/l of thickeners selected from the group consisting of polyvinylalcohol, sodium carboxymethylcellulose and starch.

3. A composition for producing an adhesive layer precipitate with a high specific surface on iron, aluminum, zinc, and their technical alloys, comprising in aqueous solution:

15 to 25 g/l of silicate selected from the group consisting of metasilicates, monosilicates and polysilicates of alkaline metals, and silica sol transformed to $SiO_2$, with molar ratios of alkali metal oxide to $SiO_2$ of 0.80 to 0.99;

0.15 to 0.5 g/l of aluminate selected from the group consisting of sodium aluminate and aluminum hydroxide sol transformed to $Al_2O_3$, with molar ratios of alkali metal oxide to $Al_2O_3$ of 0.6 to 1;

0.05 to 0.15 g/l ferric hydroxide sol transformed to $Fe_2O_3$;

chelating agents selected from the group consisting of 3 to 5 g/l $Na_4EDTA$ and 1 to 1.5 g/l sodium huminate;

pH buffers, whereby the hydroxyl ion activity corresponds to a pH of 11.5 to 12.5;

0.1 to 1 g/l of protective colloids selected from the group consisting of chelated acrylic acid, chelated methacrylic acid, sodium carboxymethylcellulose, starch, polyvinylalcohol, sodium huminate, and calcium ligninsulphonate; and 0.01 to 0.1 g/l of surfactant selected from the group consisting of an adduct of polyethylene oxide with higher fatty alcohols having 8 or more carbons dissolved in water.

4. A composition as in claim 3, additionally comprising:

5 to 50 g/l of thickeners selected from the group consisting of polyvinylalcohol, sodium carboxymethylcellulose and starch, and wherein the pH buffer is selected from the group consisting of alkali metal orthophosphate and tetraborate.

5. A composition for producing an adhesive layer precipitate with a high specific surface on iron, aluminum, zinc, and their technical alloys, comprising in aqueous solution:

15 to 25 g/l of silicate selected from the group consisting of metasilicates, monosilicates and polysilicates of alkaline metals, and silica sol transformed to $SiO_2$, with molar ratios of alkali metal oxide to $SiO_2$ of 0.80 to 0.99;

0.15 to 0.5 g/l of aluminate selected from the group consisting of sodium aluminate and aluminum hydroxide sol transformed to $Al_2O_3$, with molar ratios of alkali metal oxide to $Al_2O_3$ of 0.6 to 1;

0.05 to 0.15 g/l ferric hydroxide sol transformed to $Fe_2O_3$;

chelating agents selected from the group consisting of 3 to 5 g/l $Na_4EDTA$ and 1 to 1.5 g/l sodium huminate;

pH buffers selected from the group consisting of alkali metal orthophosphate and tetraborate, whereby the hydroxyl ion activity corresponds to a pH of 11.5 to 12.5;

0.1 to 1 g/l of protective colloids selected from the group consisting of sodium carboxymethylcellulose, starch, polyvinylalcohol, sodium huminate, and calcium ligninsulphonate;

0.01 to 0.1 g/l of surfactant selected from the group consisting of an adduct of polyethylene oxide with higher fatty alcohols having 8 or more carbons dissolved in water; and 5 to 50 g/l of thickeners selected from the group consisting of polyvinylalcohol, sodium carboxymethylcellulose and starch.

6. A composition as in claim 1 having a pH of 12.5 and wherein the silicate is sodium metasilicate, the aluminate is sodium aluminate, the chelating agent is a sodium salt of humic acid, the protective colloid is dextrin, the buffer is sodium dihydrogenphosphate, and the surfactant is an adduct of polyethylene oxide with higher fatty alcohols having 8 or more carbons.

7. A composition as in claim 1 having a pH of 12.5 and wherein the silicate is sodium metasilicate and silica hydrosol, the aluminate is sodium aluminate, the protective colloid is calcium ligninsulphonate, the buffer is trisodium orthophosphate, and the surfactant is dimethylaminoxide.

8. A composition as in claim 1 wherein the silicate is sodium metasilicate, the aluminate is sodium stabilized aluminum hydroxide sol, the chelating agent is sodium huminate and $Na_4EDTA$, the protective colloid is sodium carboxymethylcellulose, and the buffer is trinatrium orthophosphate, and the surfactant is an adduct of polyethylene oxide with higher fatty alcohols having from 8 to 18 or more carbons.

9. A composition as in claim 1 wherein the silicate is sodium metasilicate and the aluminate is sodium aluminate, and wherein sodium dodecylbenzenesulphonate, calcium ligninsulphonate, and sodium carboxymethylcellulose comprise additional protective colloid and thickener components.

10. A composition as in claim 1 wherein the silicate is sodium metasilicate and the aluminate is sodium aluminate, and wherein sodium dodecylbenzenesulphonate, calcium ligninsulphonate, and polyvinylalcohol comprise additional protective colloid and thickener components.

11. A method for priming amphoteric metals with an adhesive surface layer comprising the steps of spraying the metal with an excess of a composition of claim 1 or claim 3 at 400 kPa and 70° C. for at least 20 seconds; and rinsing and drying the sprayed metal.

12. A method for priming amphoteric metals with an adhesive surface layer comprising the step of spraying the metal with an excess of the composition of claim 6 at 400 kPa and 70° C. for at least 20 seconds; and rinsing and drying the sprayed metal.

13. A method for priming amphoteric metals with an adhesive surface layer comprising the steps of dipping the metal in an excess of a composition of claim 1 or claim 2 at 90° C. for at least 20 seconds; and rinsing and drying the dipped metal.

14. A method for priming amphoteric metals with an adhesive surface layer comprising the steps of dipping the metal in an excess of the composition of claim 7 at 90° C. for at least 20 seconds; and rinsing and drying the dipped metal.

15. A method for priming one or more amphoteric metals with an adhesive surface layer comprising:

a first step wherein the metal is sprayed with an excess of a first aqueous solution comprising sodium metasilicate, trinatrium orthophosphate, sodium huminate, an adduct of ethylene oxide with fatty alcohols having 8 to 18 carbon atoms, and tetrasodium ethylene diaminotetraacetate at 300 to 500 kPa and 70° C. for 60 seconds;

a second step wherein the excess first aqueous solution drips off the metal without rinsing;

a third step wherein the metal is sprayed with a second aqueous solution comprising sodium stabilized aluminum hydroxide sol and sodium carboxymethylcellulose; and a fourth step wherein the metal is rinsed and subsequently dried.

16. A method for priming amphoteric metals with an adhesive surface layer at ambient temperatures comprising the step of applying an excess of the composition of claim 9 or 10 to the surface of the metal in the form of a paste, followed by rinsing and drying.

* * * * *

UNITED STATES PATENT AND TRADEMARK OFFICE

CERTIFICATE OF CORRECTION

PATENT NO. : 4,740,389

DATED : April 26, 1988

INVENTOR(S) : Karel BARTON et al.

It is certified that error appears in the above-identified patent and that said Letters Patent are hereby corrected as shown below:

On the title page

Kindly amend the name of the Assignee:

From: "Statni Vyzkmoy Ustav Ochrany Materialu G.V. Akimova," to --Statni Vyzkumny Ustav Ochrany Materialu G.V. Akimova,--

Signed and Sealed this

Eighth Day of November, 1988

Attest:

DONALD J. QUIGG

Attesting Officer

Commissioner of Patents and Trademarks